United States Patent
Rasor et al.

(10) Patent No.: US 11,240,100 B2
(45) Date of Patent: *Feb. 1, 2022

(54) USING AN OUT-OF-BAND NETWORK TO RECONFIGURE A BUS INTERFACE PORT

(71) Applicant: INTERNATIONAL BUSINESS MACHINES CORPORATION, Armonk, NY (US)

(72) Inventors: Louis A Rasor, Tucson, AZ (US); Sean P. Riley, Tucson, AZ (US); Juan J. Ruiz, Daly City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/735,701

(22) Filed: Jan. 7, 2020

(65) Prior Publication Data

US 2020/0145281 A1 May 7, 2020

Related U.S. Application Data

(63) Continuation of application No. 15/814,386, filed on Nov. 15, 2017, now Pat. No. 10,567,215, which is a
(Continued)

(51) Int. Cl.
*H04L 12/40* (2006.01)
*H04L 12/24* (2006.01)

(52) U.S. Cl.
CPC .......... *H04L 41/0672* (2013.01); *H04L 12/40* (2013.01); *H04L 12/40104* (2013.01); *H04L 41/0663* (2013.01)

(58) Field of Classification Search
CPC ... H04L 12/24; H04L 12/40; H04L 12/40078; H04L 12/403; H04L 12/417;
(Continued)

(56) References Cited

U.S. PATENT DOCUMENTS 6,792,505 B2 * 9/2004 Otterness .............. G06F 3/0617
709/212
7,424,525 B2 * 9/2008 Guarraci ............. G06F 11/2294
709/217
(Continued)

OTHER PUBLICATIONS

"PEX 8664, PCI Express Gen 2 Switch, 64 Lanes, 16 Ports, Product Brief", Version 1.1, PLX Technology, May 14, 2009, pp. 6.
(Continued)

*Primary Examiner* — Frank Duong
(74) *Attorney, Agent, or Firm* — Konrad Raynes Davda & Victor LLP; David W. Victor (57) ABSTRACT

Provided are a computer program product, system, and method for using an out-of-band network to coordinate a first node reconfiguring a bus interface port used by a second node to communicate on a bus. The first node configures the bus to enable the second node to link to the bus. The second node sends a join request to the first node over an out-of-band network separate from the bus in response to determining that the second node cannot join the bus. The first node reconfigures the bus to enable the second node to communicate on the bus in response to receiving the join request from the second node over the out-of-band network.

20 Claims, 7 Drawing Sheets

Related U.S. Application Data continuation of application No. 14/918,983, filed on Oct. 21, 2015, now Pat. No. 9,860,113.

(58) Field of Classification Search
CPC ... H04L 41/022; H04L 41/0226; H04L 41/04; H04L 41/12; H04L 41/0816; H04L 41/0896; H04L 41/50; H04L 45/00; H04L 45/02; H04L 45/04

See application file for complete search history.

(56) References Cited

U.S. PATENT DOCUMENTS

| | | | |
|---|---|---|---|
| 7,966,402 | B2 | 6/2011 | Emerson et al. |
| 8,346,912 | B2 | 1/2013 | Bhadri et al. |
| 8,461,868 | B1 | 6/2013 | Wang |
| 8,995,424 | B2 | 3/2015 | Shetty et al. |
| 9,086,965 | B2 | 7/2015 | Adar et al. |
| 9,860,113 | B2 | 1/2018 | Rasor et al. |
| 2009/0063894 | A1 | 3/2009 | Billau et al. |
| 2013/0042045 | A1 | 2/2013 | Davis et al. |
| 2015/0074250 | A1 | 3/2015 | Chang et al. |
| 2015/0149691 | A1 | 5/2015 | Baxter |
| 2018/0077008 | A1 | 3/2018 | Rasor et al. |

OTHER PUBLICATIONS

"Non-Transparent Bridging Makes PCI-Express HA Friendly", EE Times, [online] [retrieved Sep. 28, 2015] http://www.eetimes.com/document.asp?doc_id=1202802&print=yes, pp. 6.

"NVM Express 1.2", Revision 1.2, NVM Exress, Nov. 3, 2014, pp. 205.

M. Jackson, et al., "PCI Express Technology", MindShare Technology Series, MindShare, Inc., Sep. 2012, pp. 181.

K. Kong, "Using PCI Express® as the Primary System Interconnect in Multiroot Compute, Storage, Communications and Embedded Systems", White Paper, Integrated Device Technology, 2008, pp. 12.

"PHY Interface For the PCI Express, SATA, and USB 3.1 Architectures", Intel Corporation, 2007-2014, pp. 99.

J. Tate, et al., "IBM SAN Surviva Guide", IBM Corporation, Document No. SG24-6143-01, Aug. 2003, pp. 662.

List of IBM Patents or Patent Applications Treated as Related, dated Jan. 6, 2020, pp. 2. [18.611C2 (Appendix P)].

Office Action dated Mar. 23, 2017, pp. 14 for U.S. Appl. No. 14/918,983, filed Oct. 21, 2015, (18.611).

Response dated Jun. 19, 2017, pp. 9, to Office Action dated Mar. 23, 2017, pp. 14 for U.S. Appl. No. 14/918,983, filed Oct. 21, 2015, (18.611).

Notice of Allowance dated 207-08-23, pp. 8 for U.S. Appl. No. 14/918,983, filed Oct. 21, 2015, (18.611).

Office Action 1 for U.S. Appl. No. 15/814,386, dated Feb. 14, 2019, 18 pp. [18.611C1 (OA1)].

Response to Office Action 1 for U.S. Appl. No. 15/814,386, dated Apr. 17, 2019, 11 pp. [18.611C1 (ROA1)].

Final Office Action 1 for U.S. Appl. No. 15/814,386, dated Jul. 5, 2019, 10 pp. [18.611C1 (FOA1)].

Response to Final Office Action 1 for U.S. Appl. No. 15/814,386, dated Sep. 10, 2019, 7 pp. [18.611C1 (RFOA1)].

Notice of Allowance 1 for U.S. Appl. No. 15/814,386, dated Sep. 25, 2019, 8pp. [18.611C1 (NOA1)].

* cited by examiner

USING AN OUT-OF-BAND NETWORK TO RECONFIGURE A BUS INTERFACE PORT

BACKGROUND OF THE INVENTION

1. Field of the Invention

The present invention relates to a computer program product, system, and method for using an out-of-band network to coordinate reconfiguring a bus interface port.

2. Description of the Related Art

In certain systems, interconnected nodes, such as servers, Central Electronic Complexes (CEC), and other devices, may communicate and share resources over a bus, such as a Peripheral Component Interconnect Express (PCIe) bus. When a server attempts to connect to the bus, it checks the link status to the bus. If the link status is not operational, then an action is taken to repair the secondary server connection to the PCIe bus without affecting other devices and servers connected to the PCIe network so they may continue to handle host requests to storage systems also connected to the PCIe bus.

There is a need in the art for improved techniques to reconfigure a node or server to connect to a bus or network if it cannot connect.

SUMMARY

Provided are a computer program product, system, and method for using an out-of-band network to coordinate a first node reconfiguring a bus interface port used by a second node to communicate on a bus. The first node configures the bus to enable the second node to link to the bus. The second node sends a join request to the first node over an out-of-band network separate from the bus in response to determining that the second node cannot join the bus. The first node reconfigures the bus to enable the second node to communicate on the bus in response to receiving the join request from the second node over the out-of-band network.

The described embodiments provide techniques to reconfigure the bus by signaling a node over a separate out-of-band network to reconfigure the bus to enable a second node to communicate on the bus when the second node cannot connect. This allows the connection to be reset without intervention by an administrator or third party entity.

In further embodiments, the first node determines that the second node is not available and performs a failover configuration to remove the second node from the bus, wherein the operations of the sending the join request and reconfiguring the bus are performed after second node becomes available after the first node performs the failover configuration.

With the described embodiments, when the second node becomes available again after becoming unavailable and removed from the bus, the second node may send a join request to have the first node reconfigure the bus if the second node is unable to immediately reconnect after failover.

In further embodiments, the first and second nodes communicate on the bus via first and second ports that provide first and second links to the bus, respectively, wherein the first node during the configuring and the reconfiguring configures the second port to be in a state that would allow the second node to reconnect after the second node recovers from unavailability.

In further embodiments, the second node activates the second port to communicate on the bus when the second node becomes available. The second node determines that a link status to connect to the bus over the second node is not good, and the join request is sent in response to determining that the link status is not good.

With the described embodiments, the second node automatically pursues out-of-band reconfiguration with the join request when determining that the link status after trying to reconnect after the failure is not good.

In further embodiments, the first node reconfigures hardware in the bus related to the second port, wherein additional nodes remain connected to the bus via additional ports while the first node reconfigures the second port for communication on the bus.

In further embodiments, the first node communicates to the second node over the out-of-band network that the reconfiguration of the second port completed and the second node reattempts to connect to the bus in response to receiving the communication over the out-of-band network that the reconfiguration of the second port completed.

With described embodiments, the automatic reconfiguration using the out-of-band network to signal the first node to reconfigure the bus is performed without affecting other nodes connected on the bus because the first node reconfigures the bus hardware related to the second node without affecting other node operations. This is particularly useful for systems requiring continuous availability, such as embodiments where the nodes comprise servers that connect over the bus.

DETAILED DESCRIPTION

Described embodiments provide techniques for a secondary node to notify the controller node of the bus over an out-of-band network that the node secondary node cannot connect to the bus. The controller node may then reconfigure the secondary node port and connection to the bus, and send a message to the secondary node when the reconfiguration is complete so that the secondary node may retry to connect.

Figure 1:
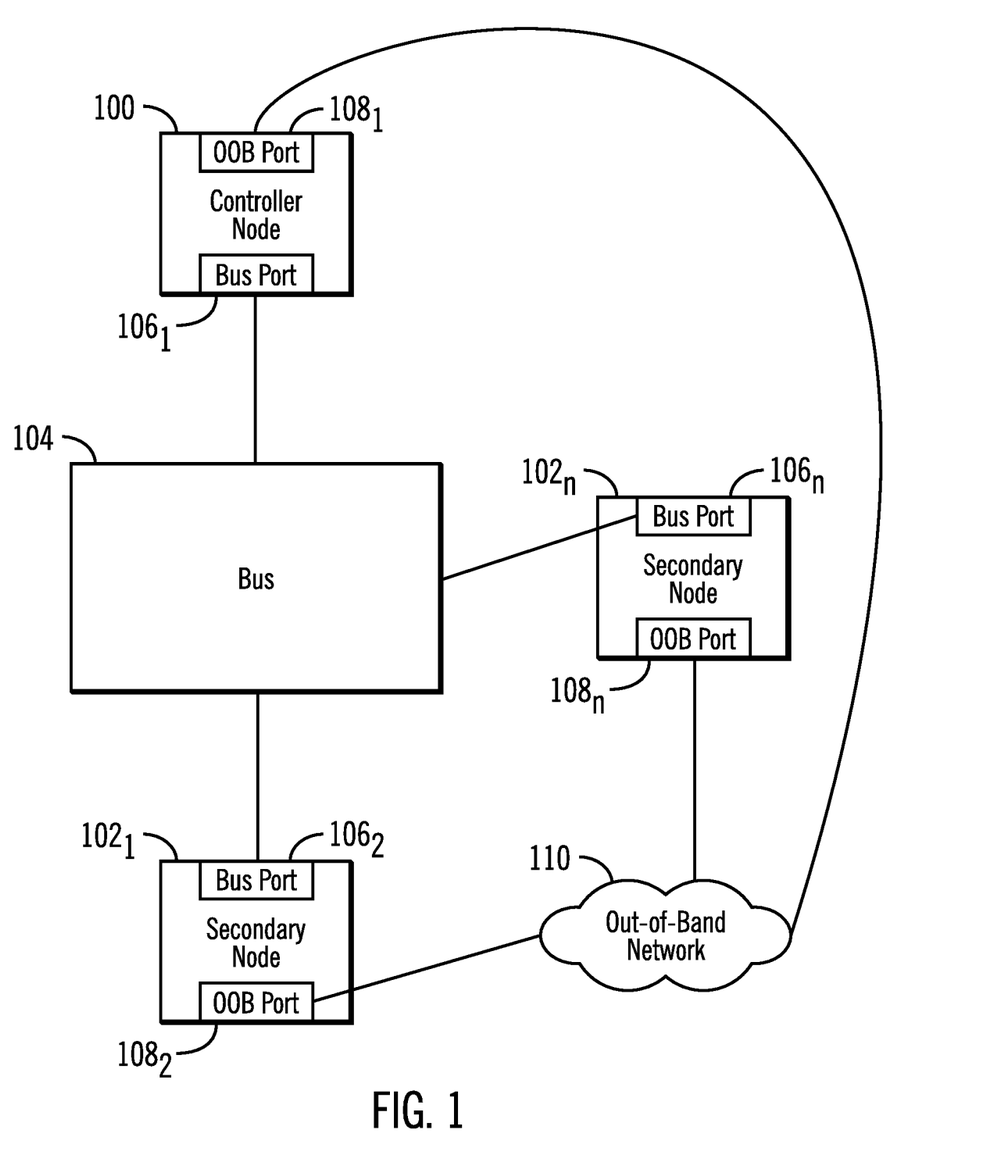
FIGS. 1 and 2 illustrate embodiments of nodes linked to a bus.

FIG. 1 illustrates an embodiment of a system having a controller node 100 and one or more secondary nodes $102_1 \ldots 102_n$ that communicate over a bus 104 with which they connect via respective bus ports $106_1, \ldots 106_2 \ldots 106_n$. The nodes 100, $102_1 \ldots 102_n$ may further include out-of-band ("OOB") ports $108_1, 108_2 \ldots 108_n$ that allow for communication over an out-of-band network 110 that comprises separate hardware from the bus 104. In one embodiment, the bus 104 may comprise a Peripheral Component Interconnect Express (PCIe) bus and the out-of-band network 110 may comprise a separate interface, such as an Ethernet network, Storage Area Network (SAN) or a separate PCIe network.

In PCIe embodiments, the controller node 100 and secondary nodes $102_1 \ldots 102_n$ may connect over links implemented in the bus 104 that comprise transmit and receive pairs. The controller node 100 may comprise a root complex processor and the other nodes $102_1 \ldots 102_n$ may comprise endpoint devices. In further embodiments, the bus 104 may comprise a PCIe switch or fabric and the nodes 100, $102_1 \ldots 102_n$ connect to the PCIe switch 104 via a non-transparent bridge (NTB). The bus 104 forwards packets between the controller node 100 and the secondary endpoint devices $102_1 \ldots 102_n$. The controller node 100 may manage and maintain the bus 104 interface and send heartbeat signals to the secondary nodes $102_1 \ldots 102_n$ to determine whether they are still available and whether a failover needs to be performed to reconfigure any unavailable secondary nodes $102_1 \ldots 102_n$ to remove from the bus 104.

Figure 2:
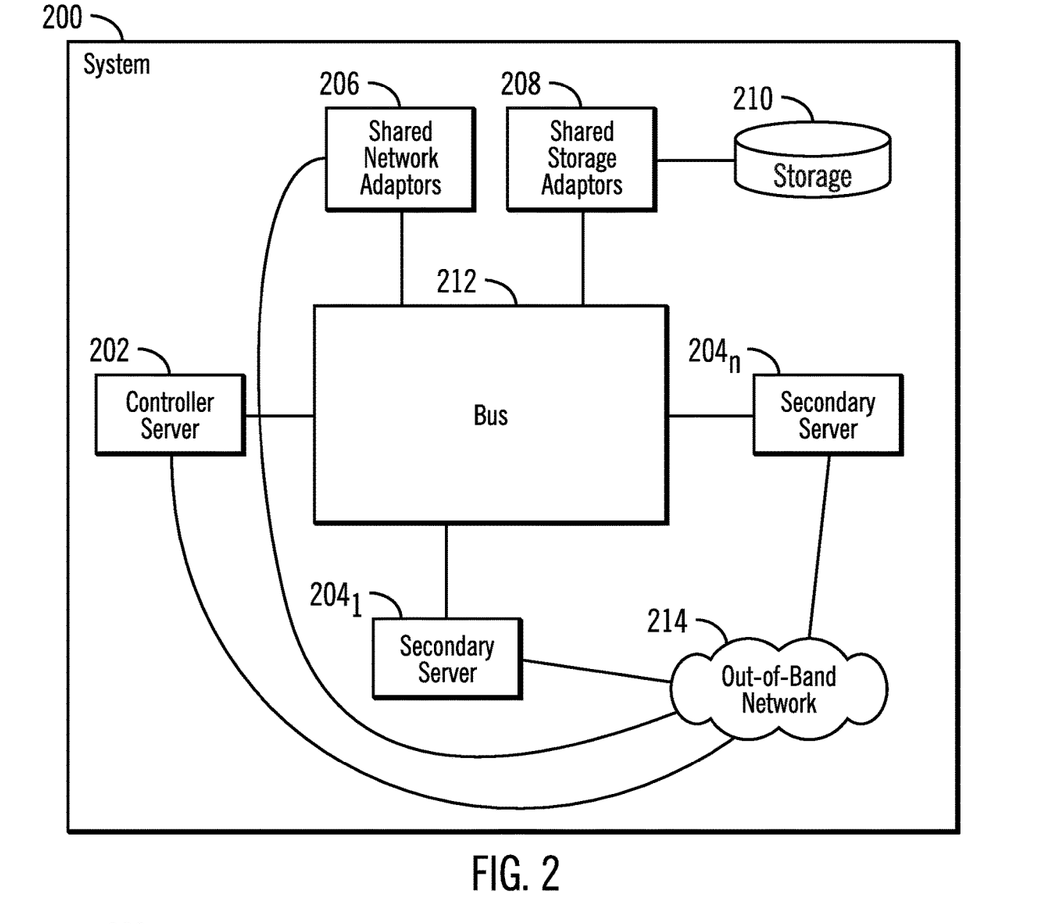

FIG. 2 illustrates an embodiment of a system 200 providing an implementation of the nodes and bus of FIG. 1. The system 200 includes a controller server 202 and a plurality of secondary servers $204_1 \ldots 204_n$, such as a Central Electronic Complexes (CEC), that share network adaptors 206 and storage adaptors 208. The shared network adaptors 206 provide access to a network (not shown) to allow communication over the network with other hosts and the shared storage adaptors 208 provide access to shared storages 210. The servers 202, $204_1 \ldots 204_n$ and shared devices 206, 208 may operate as the nodes 100, $102_1 \ldots 102_n$ in FIG. 1. The servers 202, $204_1 \ldots 204_n$, shared network adaptors 206, and shared storage adaptors 208 communicate over a bus 212. Further, the nodes 202, $204_1 \ldots 204_n$, 206, 208 may also communicate through an out-of-band network 214 in the manner described with respect to the nodes of FIG. 1.

Figure 3:
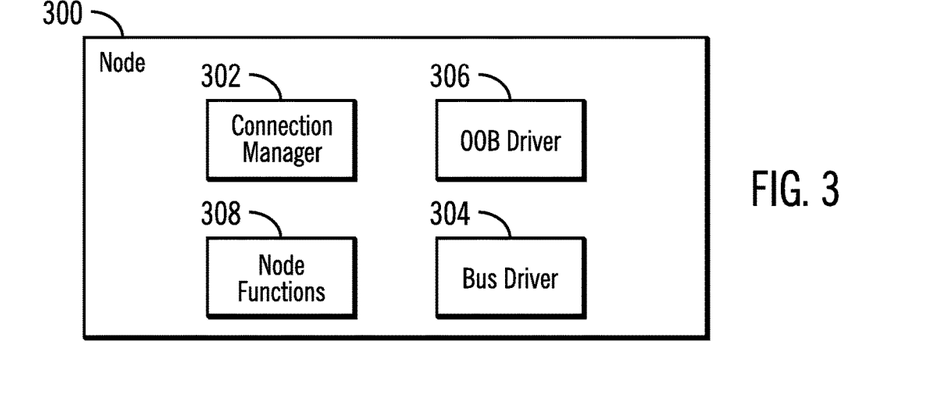
FIG. 3 illustrates an embodiment of components in the nodes linked to the bus.

FIG. 3 illustrates an embodiment of components included in a node 300, such as the nodes 100, $102_1 \ldots 102_n$, 202, $204_1 \ldots 204_n$, 206, and 208 in FIGS. 1 and 2, including a connection manager 302 that manages connections, a bus driver 304 to communicate on the bus 104, 212, an out-of-band (OOB) driver 306 to communicate on the OOB network 110, 214, and node functions 308 to perform node specific operations. The components 302, 304, 306, and 308 may comprise a software program in a memory executed by a processor of the node 300. In an alternative embodiment, some portion or all of the components 302, 304, 306, 308 may be implemented in a hardware component, such as a dedicated integrated circuit, e.g., Application Specific Integrated Circuit (ASIC), expansion card, etc.

FIGS. 4-7 illustrate operations performed by the connection manager 302 and bus 304 and OOB drivers 306 in the controller nodes 100, 202 and the secondary nodes $102_1 \ldots 102_n$, $204_1 \ldots 204_n$ to handle a failover situation at one of the secondary nodes $102_i$, $204_i$.

Figure 4:
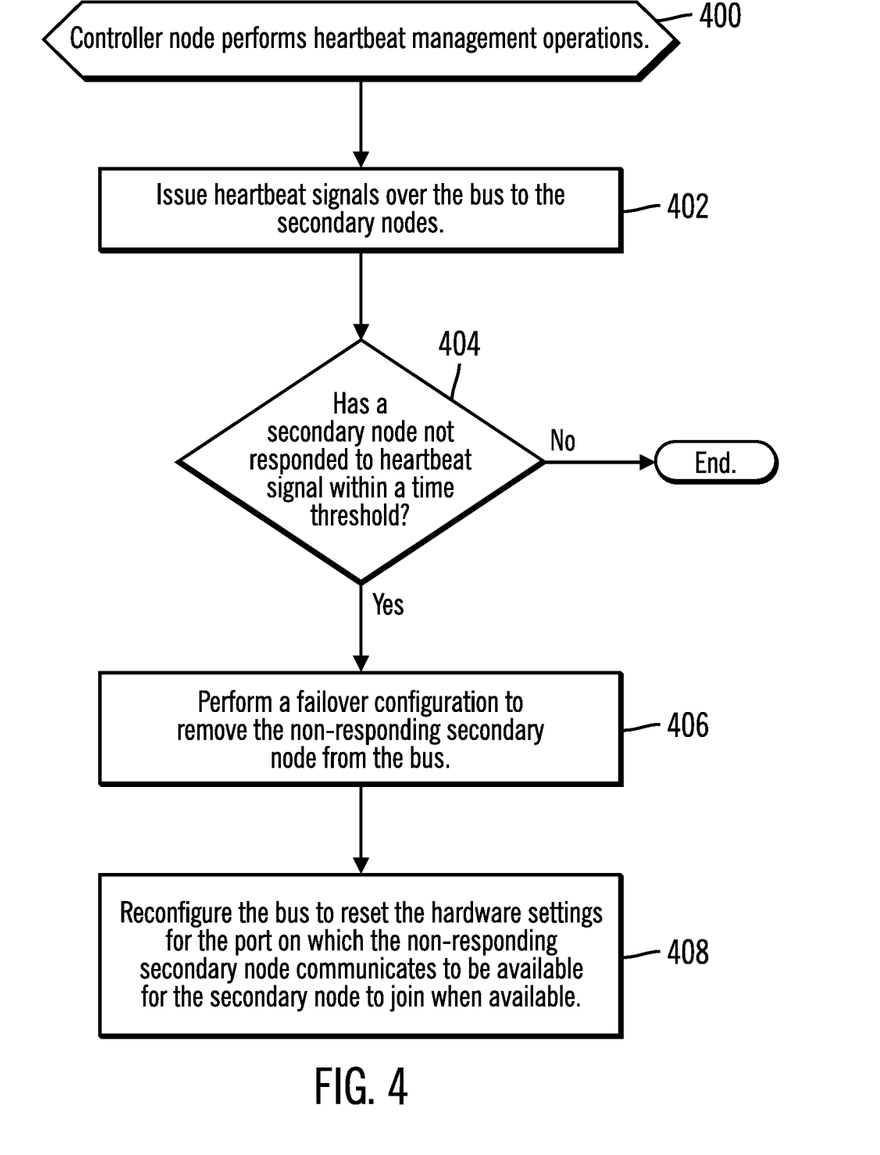
FIG. 4 illustrates an embodiment of heartbeat operations for nodes connected on the bus.

FIG. 4 illustrates an embodiment of operations performed by the controller node 100 (or controller server 202), such as in the bus driver 304, to manage heartbeat signals to the secondary nodes $102_1 \ldots 102_n$, $204_1 \ldots 204_n$. Upon managing heartbeat signals (at block 400), the control node 100, 202 bus driver 304 issues (at block 402) heartbeat signals over the bus 104, 212 to the secondary nodes $102_1 \ldots 102_n$, $204_1 \ldots 204_n$. If (at block 404) one of the secondary nodes $102_i$, $204_i$, has not responded to the heartbeat signal within a time threshold, then the controller node 100, 202 bus driver 304 performs (at block 406) a failover configuration to remove the non-responding secondary node $102_i$, $204_i$ from the bus 104, 212. The controller node 100, 202 reconfigures (at block 408) the bus 104, 212 to reset the hardware settings for the port $106_i$ on which the non-responding secondary node communicates to be available for the secondary node $102_i$ to join when available. If (at block 404) no secondary node has not responded to the heartbeat signal for the threshold time, then control ends. The operations of FIG. 4 may be periodically performed by the controller node 100, 202 to periodically determine whether failover needs to be performed for an unavailable secondary node $102_i$, $202_i$. A secondary node $102_i$, $202_i$ may be unavailable as a result of a failure, error or intentional action to take the secondary node offline for upgrades, repair, etc.

Figure 5:
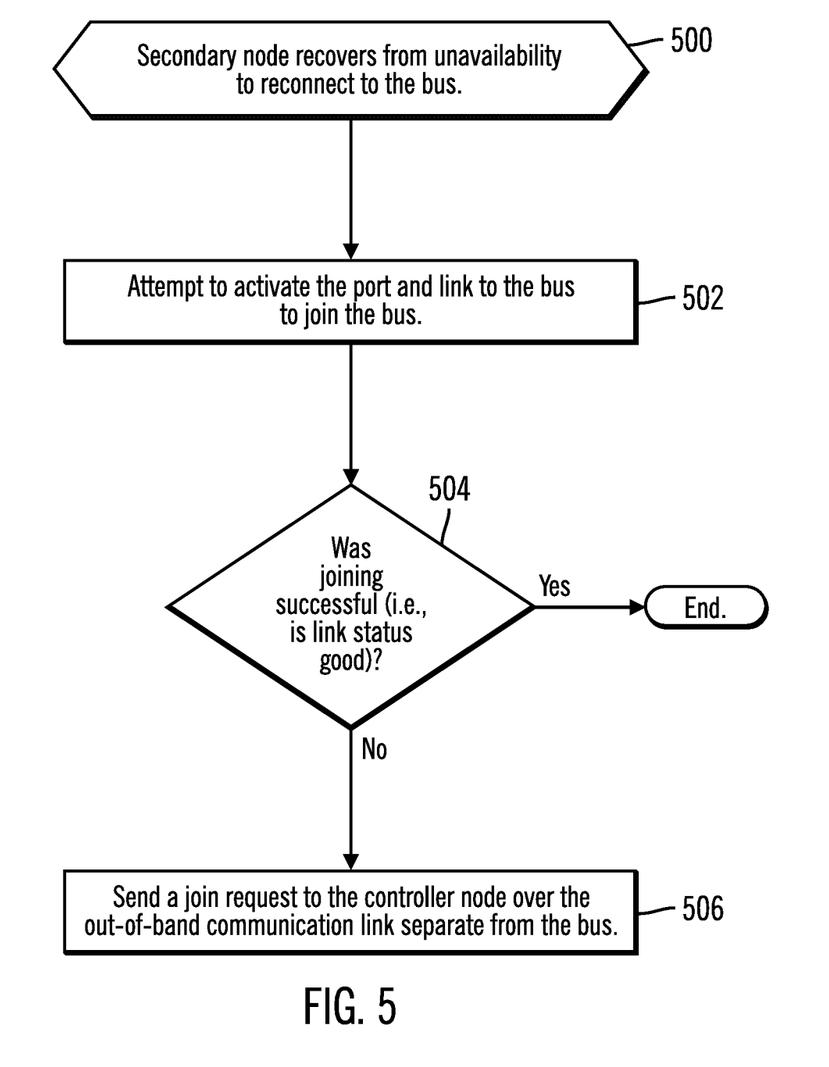
FIG. 5 illustrates an embodiment of operations for a secondary node to reconnect to the bus.

FIG. 5 illustrates an embodiment of operations performed in the secondary node $102_i$, $204_i$ to connect to the bus 104, 212. These operations may be performed after becoming available after being unavailable or removed from the bus 104, 212. The operations of FIG. 5 may be performed in the connection manager 302, bus driver 304, and OOB driver 304 components of the secondary node $102_i$, $204_i$. Upon a secondary node $102_i$, $204_i$ becoming available (at block 500), the secondary node $102_i$, $204_i$ connection manager 302 and bus driver 304 attempts to activate (at block 502) the port $106_i$ and link to join the bus. If (at block 504) the effort to join the bus 104, 112 was successful, which is determined if the link status of the port $106_i$ is good, then control ends. Otherwise, if (at block 504) the secondary node $102_i$, $204_i$ bus driver 304 cannot reconnect to the bus 104, 212 through the port $106_i$, then the secondary node $102_i$, $204_i$ connection manager 302 uses the OOB driver 304 and OOB port $108_i$ to send (at block 506) a join request to the controller node 100, 202 over the out-of-band (OOB) network 110, 214 separate from the bus 104, 212.

Figure 6:
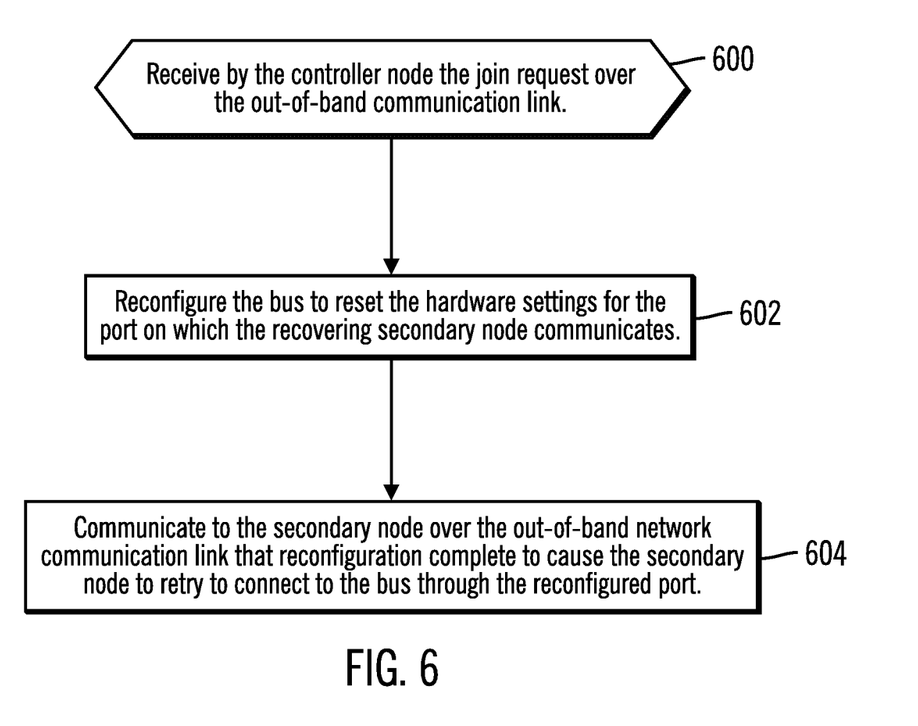
FIG. 6 illustrates an embodiment of operations to process a join request from a secondary node trying to connect to the bus.

FIG. 6 illustrates an embodiment of operations performed by the controller node 100, 202, such as the connection manager 302, bus driver 304, and OOB driver 306, upon receiving over the out-of-band network 110, 214 a join request from a secondary node $102_i$, $204_i$ unable to reconnect to the bus 104, 212. Upon receiving (at block 600) by the controller node 100, 202 OOB driver 306 the join request for an identified secondary node $102_i$, $204_i$ over the OOB network 104, 214 on OOB port $108_1$, the controller node 102, 202 connection manager 302 may call the bus driver 304 to reconfigure (at block 602) the bus 104, 212 to reset the hardware settings for the port $106_i$ on which the recovering secondary node communicates. For instance, the reconfiguration operations may clear credit buffers, settings, registers, etc. for the bus port $106_i$ used by the recovering secondary node $102_i$, 204$i$ to communicate on the bus 104, 212. The reconfiguration operations at block 602 may comprise the same operations performed at block 408 in FIG. 4.

After reconfiguring the port $106_i$ of the recovering node $102_i$, $204_i$, the controller node 100, 202 connection manager 302 uses the OOB driver 306 to communicate over the out-of-band network 110, 214 (at block 604) to the secondary node $102_i$ on OOB port $108_i$ that sent the join request that the reconfiguration is complete to cause the secondary node $102_i$, $204_i$ to retry to connect to the bus 104, 212 through the reconfigured port $106_i$.

Figure 7:
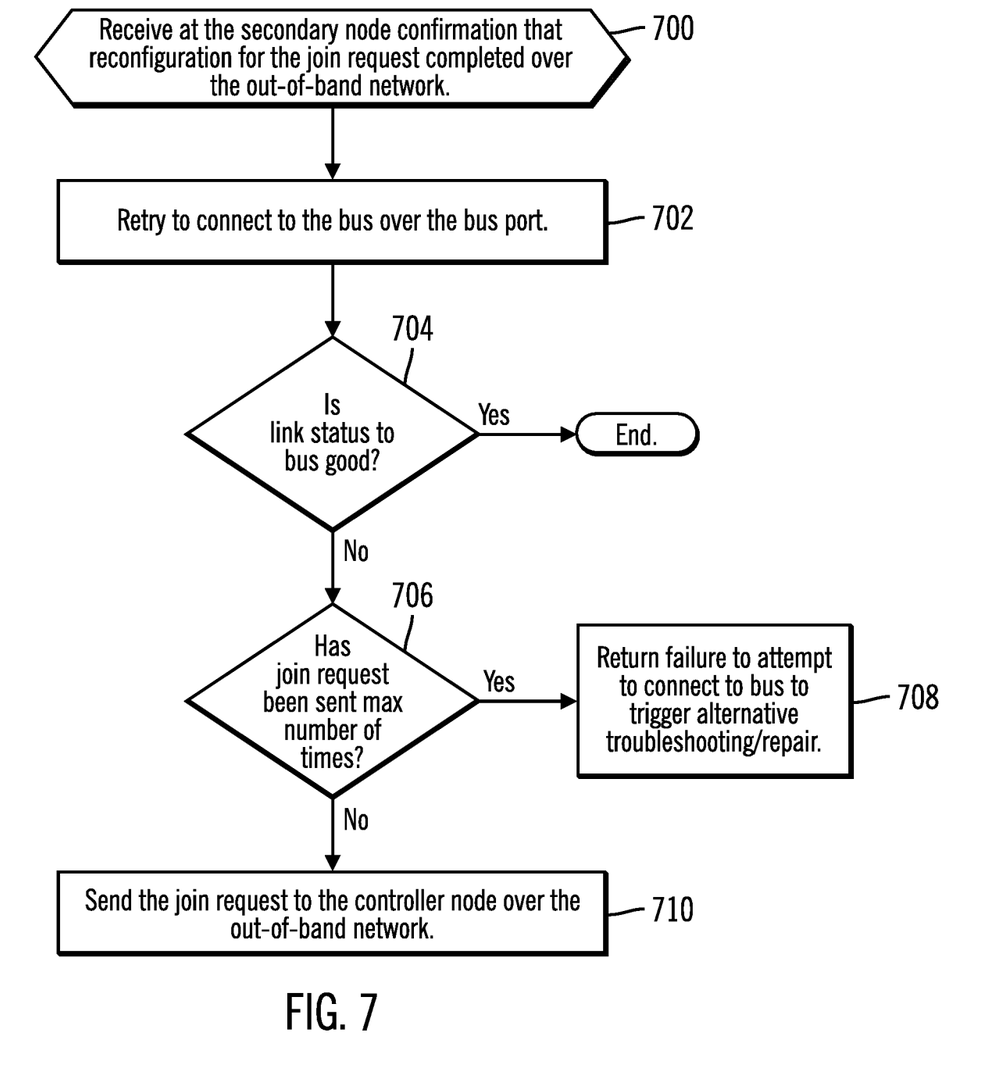
FIG. 7 illustrates an embodiment of operations performed by a secondary node to try to reconnect to the bus after sending the join request.

FIG. 7 illustrates an embodiment of operations performed by the secondary node $102_i$, $204_i$ upon receiving confirmation that the reconfiguration performed in response to the join request completed. Upon receiving (at block 700) the confirmation that the reconfiguration completed, the secondary node $102_i$, $204_i$ bus driver 304 retries (at block 602) to connect to the bus 104, 212 over the bus port $106_i$. If (at block 704) the link status of the connection through the reconfigured port $106_i$ is good, then control ends. If (at block 704) the link status is not good, then the secondary node $102_i$, $204_i$ connection manager 302 determines (at block 706) whether the join request has been sent a maximum number of times. If so, then failure is returned (at block 708) for the effort to connect to the bus 104, 212, which triggers some alternative troubleshooting or repair, such as calling a repair person. If (at block 706) the request has not been sent the maximum number of times, then the secondary node $102_i$, $204_i$ connection manager 302 uses the OOB driver 306 to send (at block 710) a join request to the controller node 100, 202 over the out-of-band network 110, 214 on OOB port $108_i$.

With the described embodiments, a node communicating on a bus may send a join request over an out-of-band network if the node cannot connect over the primary communication bus to cause the controller or primary node to reconfigure the bus port used by the node to communicate on the bus.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
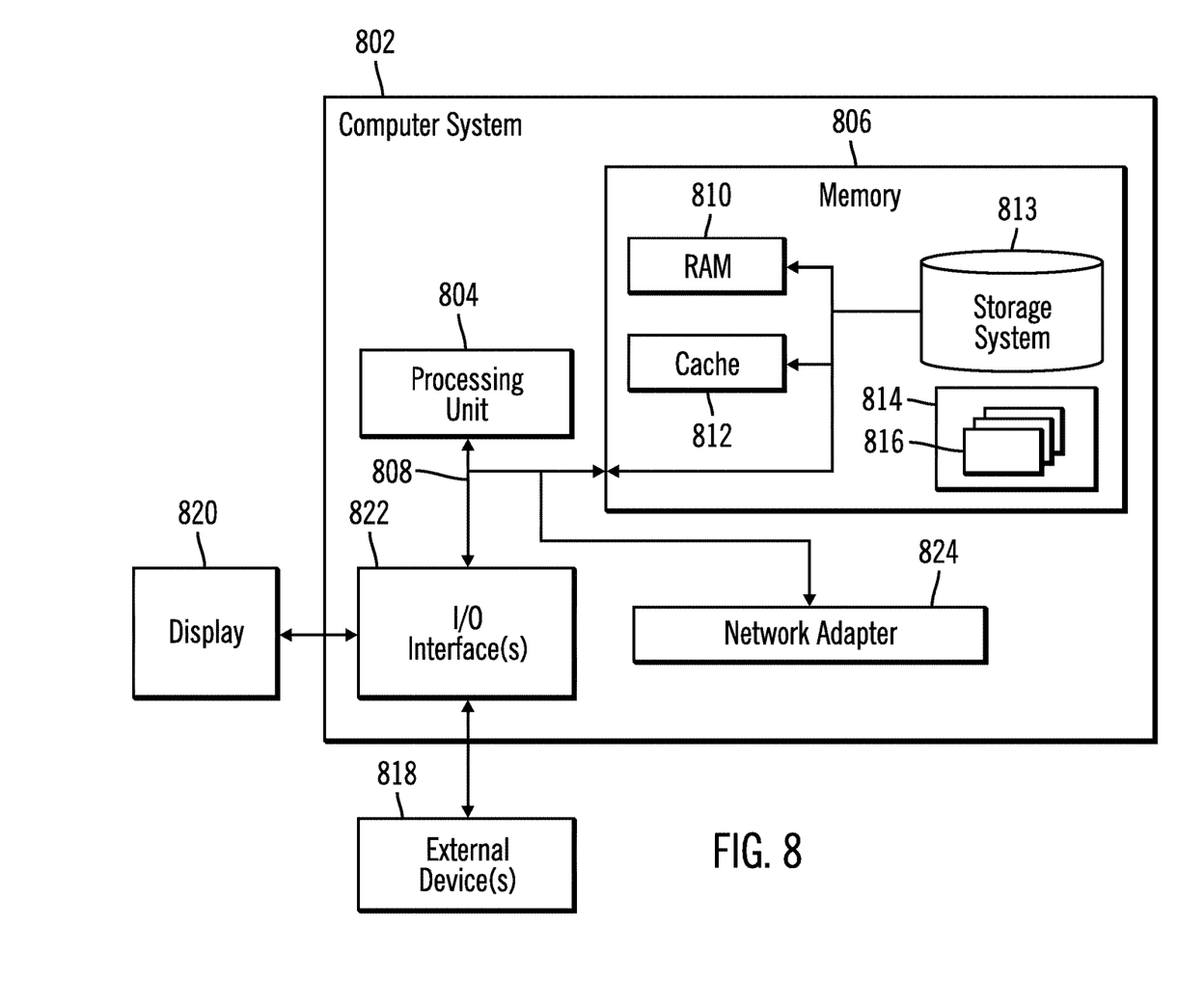
FIG. 8 illustrates a computing environment in which the components of FIG. 1 may be implemented.

The computational components of FIGS. 1 and 2, including the nodes 100, $102_1 \ldots 102_n$, 202, and $204_1 \ldots 204_n$ may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The reference characters used herein, such as i and n, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for a plurality of nodes including a first node and a second node to communicate on a bus, wherein the computer program product comprises a computer readable storage medium having program instructions embodied therewith, the program instructions executable by processors on the first and the second nodes cause operations, the operations comprising:
    determining by the first node that the second node is unavailable;
    performing, by the first node, a failover configuration to remove the second node from the bus;
    sending, by the second node, a join request to the first node over an out-of-band network separate from the bus in response to recovering from unavailability; and
    reconfiguring the bus, by the first node, to enable the second node to communicate on the bus while additional nodes from the plurality of nodes remain connected to the bus in response to receiving the join request from the second node over the out-of-band network.

2. The computer program product of claim 1, wherein the operations further comprise:
    attempting by the second node to join the bus after determining that the second node cannot join the bus in response to recovering from unavailability, wherein the sending the join request is performed in response to the attempt to join the second node failing.

3. The computer program product of claim 1, wherein the operations further comprise:
    communicating, by the first node, to the second node over the out-of-band network that the reconfiguring the bus to enable the second node completed; and
    reattempting, by the second node, to connect to the bus in response to receiving the communication over the out-of-band network that the reconfiguring the bus to enable the second node completed.

4. The computer program product of claim 1, wherein the operations further comprise:
    determining, by the second node, whether a link status to connect to a reconfigured port is good in response to reattempting to connect;
    determining, by the second node, whether the join request has been sent a maximum number of times in response to determining the link status is not good; and
    resending, by the first node, the join request to the first node in response to determining that the join request has not been sent the maximum number of times.

5. The computer program product of claim 4, wherein the operations further comprise:
    returning failure to connect to the bus to trigger an alternative troubleshooting or repair for connecting to the bus.

6. The computer program product of claim 1, wherein the first node comprises a controller server that manages access of secondary servers, including the second node, to the bus, wherein there are a plurality of network and/or storage adaptors connected to the bus, and wherein the controller server and the secondary servers share the network and/or storage adaptors over the bus.

7. The computer program product of claim 1, wherein the bus is implemented on hardware separate from the out-of-band network and wherein the first and the second nodes use separate ports to communicate on the bus and the out-of-band network.

8. A system in communication with an out-of-band network, comprising:
    a bus;
    a plurality of nodes including a first node and a second node are coupled to the bus;
    wherein the first and the second nodes include computer programmable code that when executed by the first and the second nodes performs operations, the operations comprising:
        determining by the first node that the second node is unavailable;
        performing, by the first node, a failover configuration to remove the second node from the bus;
        sending, by the second node, a join request to the first node over the out-of-band network separate from the bus in response to recovering from unavailability; and
        reconfiguring the bus, by the first node, to enable the second node to communicate on the bus while additional nodes from the plurality of nodes remain connected to the bus in response to receiving the join request from the second node over the out-of-band network.

9. The system of claim 8, wherein the operations further comprise:
    attempting by the second node to join the bus after determining that the second node cannot join the bus in response to recovering from unavailability, wherein the sending the join request is performed in response to the attempt to join the second node failing.

10. The system of claim 8, wherein the operations further comprise:
    communicating, by the first node, to the second node over the out-of-band network that the reconfiguring the bus to enable the second node completed; and
    reattempting, by the second node, to connect to the bus in response to receiving the communication over the out-of-band network that the reconfiguring the bus to enable the second node completed.

11. The system of claim 8, wherein the operations further comprise:

determining, by the second node, whether a link status to connect to a reconfigured port is good in response to reattempting to connect;

determining, by the second node, whether the join request has been sent a maximum number of times in response to determining the link status is not good; and resending, by the first node, the join request to the first node in response to determining that the join request has not been sent the maximum number of times.

12. The system of claim 11, wherein the operations further comprise:

returning failure to connect to the bus to trigger an alternative troubleshooting or repair for connecting to the bus.

13. The system of claim 8, wherein the first node comprises a controller server that manages access of secondary servers, including the second node, to the bus, wherein there are a plurality of network and/or storage adaptors connected to the bus, and wherein the controller server and the secondary servers share the network and/or storage adaptors over the bus.

14. The system of claim 8, wherein the bus is implemented on hardware separate from the out-of-band network and wherein the first and the second nodes use separate ports to communicate on the bus and the out-of-band network.

15. A method for configuring a plurality of nodes including a first node and a second node to communicate on a bus, comprising:

determining by the first node that the second node is unavailable;

performing, by the first node, a failover configuration to remove the second node from the bus;

sending, by the second node, a join request to the first node over an out-of-band network separate from the bus in response to recovering from unavailability; and reconfiguring the bus, by the first node, to enable the second node to communicate on the bus while additional nodes from the plurality of nodes remain connected to the bus in response to receiving the join request from the second node over the out-of-band network.

16. The method of claim 15, further comprising:

attempting by the second node to join the bus after determining that the second node cannot join the bus in response to recovering from unavailability, wherein the sending the join request is performed in response to the attempt to join the second node failing.

17. The method of claim 15, further comprising:

communicating, by the first node, to the second node over the out-of-band network that the reconfiguring the bus to enable the second node completed; and reattempting, by the second node, to connect to the bus in response to receiving the communication over the out-of-band network that the reconfiguring the bus to enable the second node completed.

18. The method of claim 15, further comprising:

determining, by the second node, whether a link status to connect to a reconfigured port is good in response to reattempting to connect;

determining, by the second node, whether the join request has been sent a maximum number of times in response to determining the link status is not good; and resending, by the first node, the join request to the first node in response to determining that the join request has not been sent the maximum number of times.

19. The method of claim 18, further comprising:

returning failure to connect to the bus to trigger an alternative troubleshooting or repair for connecting to the bus.

20. The method of claim 15, wherein the first node comprises a controller server that manages access of secondary servers, including the second node, to the bus, wherein there are a plurality of network and/or storage adaptors connected to the bus, and wherein the controller server and the secondary servers share the network and/or storage adaptors over the bus.

* * * * *